Oct. 24, 1967     D. L. WILDER     3,349,251
LEVEL SENSOR CIRCUIT
Filed Jan. 2, 1964     3 Sheets-Sheet 1

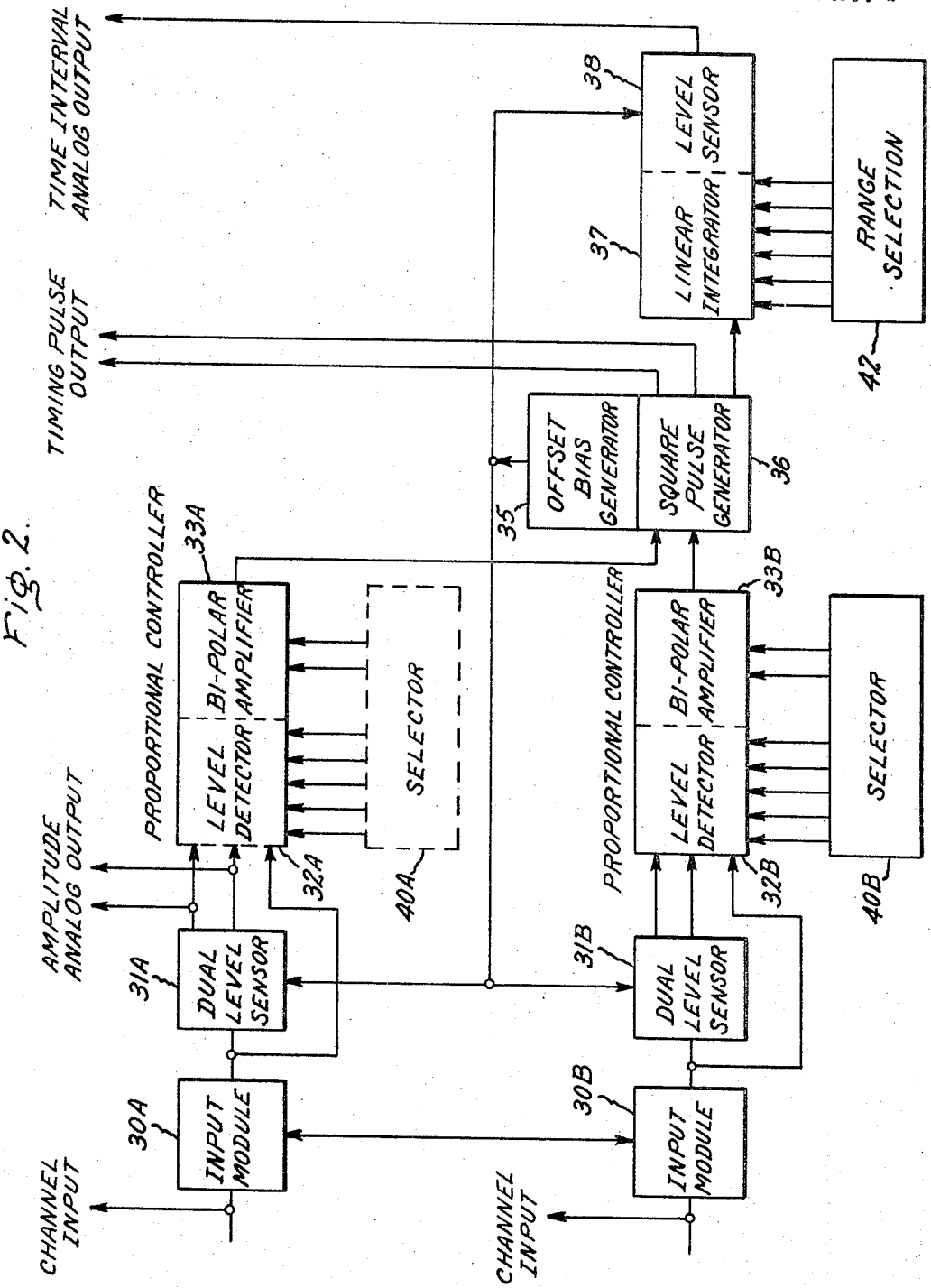

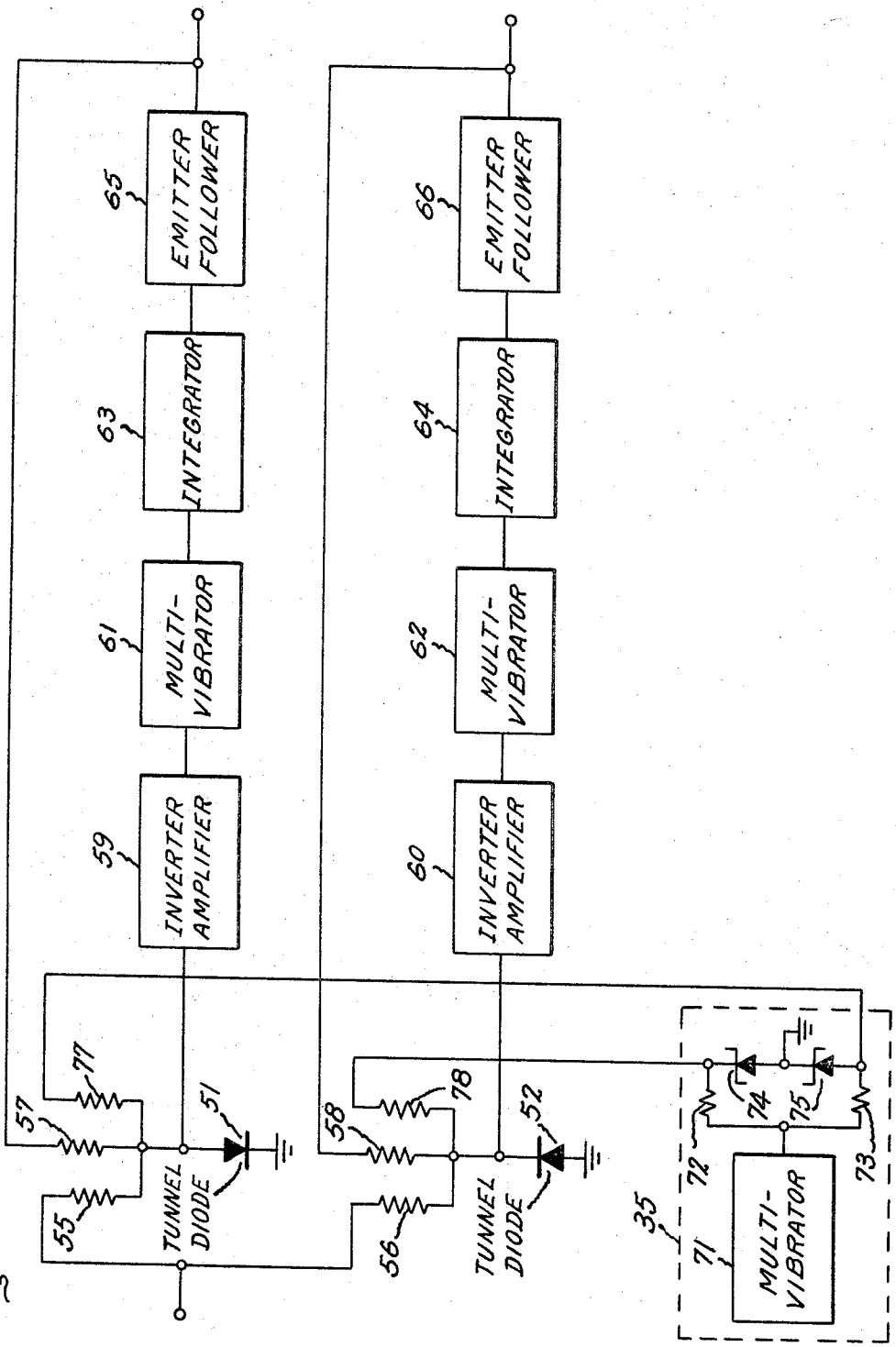

United States Patent Office

3,349,251
Patented Oct. 24, 1967

3,349,251
LEVEL SENSOR CIRCUIT
Donald L. Wilder, Vestal, N.Y., assignor to General
Electric Company, a corporation of New York
Filed Jan. 2, 1964, Ser. No. 335,281
7 Claims. (Cl. 307—88.5)

This invention relates to electronic circuits for detecting and measuring electrical pulse signals by deriving a D-C voltage signal proportional to the signal peaks. Response to low level signals of very short duration is of such speed and accuracy that the level sensor circuit is particularly useful for waveform analysis. The level sensor circuit is automatic in its operation, providing a low impedance D-C output signal suitable for programmed testing and recording and is also useful for general application including high speed data processing.

Probably the closest prior art is in the field of conventional peak detectors which derive a D-C voltage proportional to the peak voltage level in a train of pulses. This is done with pulse stretching circuits which, by means of storage capacitors and active devices supplying sufficient signal energy, produce output signals having a slowly varying D-C voltage which follows the peaks of the input pulse voltages. With pulses at video frequencies and having small duty cycle ratios, it becomes increasingly difficult to provide peak detector circuits which are isolated from the input circuits to a degree that the input signals are not distorted by unmatched loading while the desired sensitivity is retained. These problems are particularly evident when it is desirable to have the peak detector respond to pulse trains having pulse repetition rates which vary by several orders of magnitude.

Accordnigly, it is an object of the invention to provide a level sensor which produces a uniform response at pulse repetition rates that vary over several orders of magnitude such as from a few-pulses per second to video frequencies.

It is a further object to provide a level sensor which responds to pulses having pulse durations which vary over a wide range such as from a fraction of a microsecond to a fraction of a second.

It is another object of the invention to provide a level sensor which is neither sensitive to power supply variations nor dependent upon a reference voltage.

It is another object of the inventino to provide a level sensor which has no more than nominal output ripple, regardless of the pulse repetition rate.

It is another object of the invention to provide an accurate level sensor whereby a D-C output voltage is generated with a typical accuracy of one percent without critical adjustment and without complex circuits.

It is another object of the invention to provide an accurate level sensor which is relatively insensitive to temperature variations in the environment.

It is another object of the invention to provide an accurate level sensor which operates in a manner suitable for automatic test apparatus.

Briefly stated, in accordance with certain aspects of the invention, a closed loop level sensor circuit is provided. A D-C output voltage is generated by a slowly decaying storage circuit such as a RC integrating network controlling an emitter follower amplifier. A fraction of the stored output voltage is compared degeneratively with the input signal by means of a tunnel diode. The tunnel diode is therefore a switch which is actually current sensitive, but the sensitivity is so high that it requires only a small fraction of a milliampere and is arranged to be effectively responsive to the input signal voltages. When the input peak voltage level exceeds the corresponding sensor output level, the tunnel diode fires and the resulting voltage rise across the tunnel diode is used to trigger a pulse generator that produces an incremental increase in the storage network output signal with gain. The tunnel diode comparator accordingly determines whether or not the peak of an input pulse exceeds the existing corresponding sensor circuit output signal. Although the tunnel diode response is basically ON-OFF, not proportional, the closed loop operation successively approximates the input signal by the accumulation of increments up to the output voltage level corresponding to the input signal peaks.

The invention, together with further objects and advantages thereof, may best be understood by referring to the following description taken in conjunction with the appended drawings in which like numerals indicate like parts and in which:

FIGURE 2 is a block diagram of a wave analyzer system.

FIGURE 3 is a schematic diagram, partly in block diagram form, of a preferred embodiment of a dual level sensor circuit.

Figure 1:
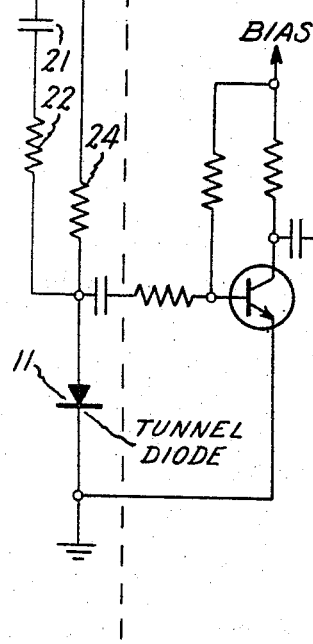
FIGURES 1 and 1A are respectively a schematic diagram of a first embodiment of the tunnel diode level sensor invention and an illustrative diagram of the tunnel diode characteristic.
Figure 1:
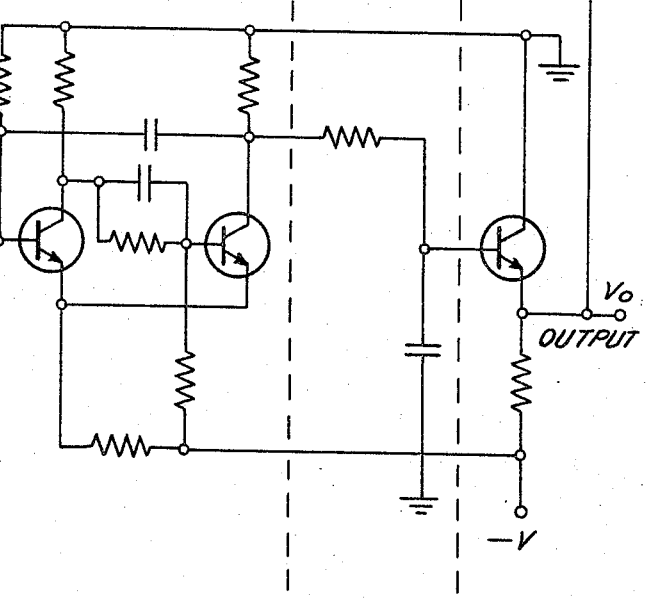
Figure 1A:
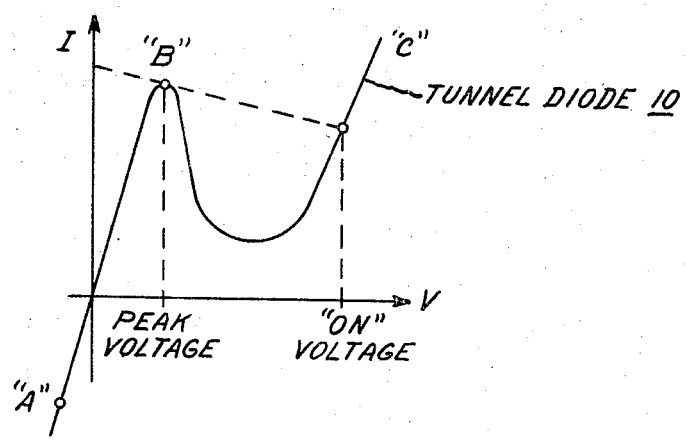

In the FIGURE 1 circuit, the tunnel diode 11 is current driven by an input pulse train the amplitude of which is to be detected. When the input pulse current causes the forward current to exceed the firing point, point B in FIGURE 1A, at typically one milliampere, the tunnel diole 11 switches "ON" and a pulse is produced. This pulse is amplified in amplifier-inverter 13 and serves as a trigger for a one-short multivibrator 14 whose output charges an integrating RC network 15. The charge on the network drives an emitter follower 16 having a negative output voltage which is resistively coupled to the tunnel diode input, and serves as a reverse bias source to null out the forward-bias current produced by the input pulse. Therefore, the tunnel diode is responsive to the difference between input and output voltages. The loop continues to function, building up charge in the RC network, until the reverse-bias current precisely equals the input pulse current amplitude minus the tunnel diode firing point current. Thus, under steady state conditions, the emitter follower output voltage is directly proportional to the peak amplitude in the input pulse.

An important feature of this circuitry is the fact that only the error sensing device, the tunnel diode 11 with its directly connected input and feedback resistors, is critical. Very wide operating parameters are tolerable in the remainder of the circuitry due to the servo loop action.

The inverter-amplifier 13, one-shot multivibrator 14, RC network 15, and emitter follower 16 are of conventional form. The inverter-amplifier 13 produces a suitable trigger pulse for the multivibrator 14. Normally this requires the generation of a pulse at a higher voltage level than that produced by firing tunnel diode 11 and with a longer duration. The operating characteristics of the tunnel diode are highly nonlinear as is apparent from inspection of the representative characteristic illustrated in FIGURE 1A. Also, it must be expected that the input waveform will be complex. The voltage peaks will be of varying duration and shape. Accordingly, it is not possible with a tunnel diode to generate an error signal which is proportional to the actual input error voltage for all waveforms. Accordingly, the closed loop cannot rely on the error signal as accurately representing the actual error on a proportional basis as is normally the case in closed loop systems. The FIGURE 1 level sensor basically relies on the tunnel diode comparator only to detect the presence or absence of the error signal to initiate a fixed increment error correction.

A basic problem will level sensors is that substantial energy gain must be added to the error response. The one-shot multivibrator 14 is a monostable flip-flop which provides most of this gain in the FIGURE 1 embodiment by essentially providing a fixed incremental energy error signal regardless of variations in actual operation of the inverter-amplifier 13. The RC network 15 is a convenient integrator with a long time constant and the emitter follower 16 reduces loading thereof to a negligible level while providing a low impedance output signal source well adapted to standard programmed recording and test comparisons or for application to a D-C voltmeter.

In FIGURE 1, the tunnel diode 11 comparator is arranged so that input signals are applied through a capacitor 21 which removes the D-C component and through the input resistor 22 so that an input current is applied to the tunnel diode 11 for comparison with the feedback signal derived from the variable output voltage $V_o$ and feedback resistor 24. In this embodiment, the D-C output signal voltage is off-set by a fixed increment from the peak input voltage. This increment is equal to the tunnel diode peak voltage at point B. In operation, the integrating RC network 15 builds up a voltage equal to input peak voltage minus the relatively small tunnel diode peak voltage. That is, the level sensor incorporates an output signal generator, emitter follower 16, which provides a signal proportional to a stored signal level, integrating RC network 15. Whenever an input pulse has an amplitude exceeding the level represented by the output signal level, meaning there is an error in the output, the comparator detects the event, producing an error signal which causes a source of constant level pulses, one-shot multivibrator 14, to apply one pulse to the integrator so as to raise the stored signal level. When the input signal pulse train is suddenly at a substantially increased peak amplitude, this operation is repeated until the stored signal level has correspondingly increased, increment by increment, until it catches up to the input signal level.

FIGURE 2 is a block diagram of a pulse analyzer system which utilizes several level sensor circuits of the type illustrated in FIGURE 1 in determining a variety of pulse parameters such as peak amplitude, pulse width, pulse delay, rise and fall times. To extend the range of pulse signals which may be measured, it is convenient to incorporate input networks 30A and 30B which switch, attenuate, amplify, and/or match the analyzer input impedance to the apparatus under test in accordance with regular test procedures. This provides the proper scale factors, typically with an operational amplifier type circuit that has a high input impedance.

Two essentially identical channels are provided in order that separate signals are made available for conveniently analyzing the leading and trailing edges of the input pulses. (Channel B is responsive to the negative going voltage levels.) In each channel, a dual level sensor, 31A and 31B, is provided for producing D-C signals proportional to the peak-to-peak amplitude of the input signals. These dual level sensors are based on the level sensor of FIGURE 1 which is adapted to respond to both positive and negative portions of the input pulse train whereby a floating D-C voltage is generated proportional to the peak-to-peak voltage. The construction of the dual level sensor will be described hereinafter in connection with FIGURE 3.

The output of the dual level sensors 31A and 31B is comprised of the floating D-C signal between two lines representing the peak-to-peak voltage and a feedthrough line transmitting the input pulse train. These signals are applied to proportional controllers which derive timing signals representing the time at which the input pulses reach selected fractions of their peak-to-peak voltages. By means of precision voltage divider resistors, fractions of the peak-to-peak D-C voltages such as 10%, 50%, 90% are compared with the input pulse wave. A tunnel diode level detector is biased to its firing point so that it responds to the pulse input voltage exceeding the selected reference voltage. Preferably a pair of tunnel diodes are incorporated in this sensor whereby pulse trains of either polarity may be accommodated. A conventional bipolarity amplifier 33A and 33B is provided for amplifying the tunnel diode firing signal. The amplifier incorporates a differentiating network in its input to sharpen the timing signals.

The signals from the leading edge channel A and from the trailing edge channel B are applied to a square pulse generator 36. This generator takes the form of a conventional flip-flop. However, to accurately represent input pulses of short duration, it is necessary that its switching be of extremely high speed so that tunnel diode flip-flops or their equivalents are required. The output of square pulse generator 36 will therefore be a train of rectangular pulses having their leading edges correspond to the selected input pulse rising edge level points and their trailing edges corresponding to the selected input pulse falling edge level points.

The linear integrator 37 converts the width of the square pulse generator 36 output to a linear ramp, the peak value of which is directly proportional to the width of the pulse. This is accomplished with a transistor switch, an RC integrator network, a buffer amplifier, and a bootstrap circuit.

The square pulse generator output pulse is used to turn off the transistor switch, allowing the RC integrator network to charge and generate a ramp voltage which is dependent on the RC integration constant specified by the automatic programmer and the width of the square pulse generator output pulse. In the absence of an input, the transistor switch turns on, shorting the RC integrator. The buffer amplifier provides isolation and drives the bootstrap circuit which, in turn, provides a feedback voltage to insure ramp linearity. The ramp output is applied to the time interval level sensor 38 where its peak value is converted to a D-C analog voltage proportional to the time interval parameter under measurement.

The same technique is used to measure rise time and fall time that is used to measure pulse width. However, for measuring rise time the proportional controller in channel A is programmed to provide a negative triggering spike that corresponds to the 10 percent amplitude point of the leading edge of the input signal, and the proportional controller in channel B is programmed to provide a positive triggering spike that corresponds to the 90 percent amplitude point of the leading edge of the input signal. Thus, the D-C voltage analog produced at the time interval level sensor 38 is proportional to the rise time of the input signal.

For measuring fall time, channel A triggers at the 90 percent amplitude point of the trailing edge of the input pulse, and channel B triggers at the 10 percent amplitude point of the trailing edge.

To measure delay, the reference pulse is applied to channel A and the proportional controller is programmed to provide a negative triggering spike corresponding to the 50 percent amplitude point of the leading edge of the reference pulse. The input signal pulse is applied to channel B and the proportional controller is programmed to provide a positive triggering spike corresponding to the 50 percent amplitude point of the leading edge of the signal pulse. Therefore, the D-C voltage analog, appearing at the time interval level sensor, is proportional to the time interval between the 50 percent amplitude points of the leading edges of the reference pulse and signal pulse, which is the delay.

It should be noted that delay measurements may be made between the 10, 50, or 90 percent amplitude point of the leading or trailing edge of the reference pulse and the 10, 50 or 90 percent amplitude point of the leading or trailing edge of a second pulse. The pulses need not be of the same polarity. Hence, measurements, such as turn-on time, propagation delay, or storage time of the amplifiers and inverters, may be made or the input and output of delay lines may be compared.

An automatic programmer-comparator selector 40A, 40B, 42 selects the signal to be monitored, sets up the scaling and mode selection relays within the waveform analyzer, sets high and low limits within the comparator, and measures all of the parameters of interest on a "go/no-go" basis.

FIGURE 3 illustrates a dual level sensor and offset bias generator suitable for use in the FIGURE 2 analyzer. The dual level sensor is comprised of two signal level sensors connected in parallel, one of which generates a D-C signal proportional to the positive peaks of the input waveform and the other generates a D-C signal proportional to the negative peaks. Accordingly, the first level sensor is comprised of a tunnel diode 51, inverter-amplifier 59, multivibrator 61, integrator 63, emitter follower 65, and summing resistors 55 and 57. These elements and circuits are interconnected in the same manner as the FIGURE 1 level sensor and accordingly operate in the same manner. The second level sensor is arranged to respond to negative polarity input signals, so that tunnel diode 52, inverter amplifier 60, multivibrator 62 and emitter follower 66 operate with opposite polarity signals whereby a negative voltage is accumulated by integrator 64.

The individual level sensors each have a threshold level determined by the firing point B in the tunnel diode characteristic. Because of this, the output signals of the FIGURE 1 level sensor is offset by an amount equal to the tunnel diode peak voltage. Since this is a known fixed factor, it is frequently preferable to simply make allowances for it in processing the output signal. However, where it is desirable to avoid offset output signals, such as in the dual level sensor of FIGURE 2, or if it is desirable to reduce the threshold sensitivity of the level sensor, the tunnel diode can be biased at its firing point such as by offset bias generator 35. A conventional free running multivibrator 71 generates a bipolar square wave for the bias voltage. A pair of parallel zener diodes 74 and 75 provide precise voltage regulation while resistors 72 and 73 prevent short circuiting. Resistors 78 and 77 provide the bias adjustment. As a result, an intermittent bias current is applied to the tunnel diode comparators which eliminates the threshold and offset voltage factors while permitting the tunnel diode comparators to be cyclically self-resetting as before which is necessary for proper operation.

While particular embodiments of the invention have been shown and described herein, it is not intended that the invention be limited to such disclosure, but that changes and modifications can be made and incorporated within the scope of the claims.

What is claimed is:
1. A tunnel diode signal level sensor for generating a D-C output signal proportional to the peaks of an input waveform comprising:
 (a) a source of input signal;
 (b) a means including integrating storage means for generating a D-C output signal;
 (c) a tunnel diode;
 (d) resistive means connected between said source and said generating means and to said tunnel diode for applying any difference between said input and output signals to said tunnel diode so that when said input signal exceeds the D-C output signal said difference will fire the tunnel diode;
 (e) circuit means responsive to firing of said tunnel diode to generate an incremental error signal;
 (f) said integrating storage means being responsive to said error signal for generating the D-C output signal.

2. A circuit for sensing the peak voltage levels in a train of pulses to be measured and generating a D-C voltage proportional thereto, comprising:
 (a) means for receiving an input pulse train signal;
 (b) means including an integrator for generating an output voltage;
 (c) a tunnel diode comparator connected to both said means for comparing the input pulse train signal so that the tunnel diode is fired when the input pulse peak voltage level exceeds the output voltage;
 (d) a pulse generator connected to the comparator for producing fixed incremental pulse signals in response to firing of said tunnel diode;
 (e) said integrator being connected to the pulse generator and being responsive to said incremental pulse signals for generating said output voltage.

3. A tunnel diode signal level sensor providing a D-C output signal proportional to the peaks of an input waveform comprising:
 (a) a source of input signal;
 (b) means for generating a D-C output signal;
 (c) a tunnel diode;
 (d) a network of resistors connected to said source and said generating means for comparing the input and output signals and for applying any difference between said signals to said tunnel diode so that an input signal exceeding the output signal level will fire the tunnel diode;
 (e) a pulse generator circuit responsive to firing of said tunnel diode to generate incremental error signals;
 (f) a long time constant RC integrating circuit connected to said pulse generator circuit and being responsive to said error signals for increasing the D-C voltage of the output signal.

4. The level sensor of claim 3, further comprising:
 (g) a bias source for applying bias pulses to said network of resistors so that the tunnel diode firing threshold is obviated.

5. A level sensor circuit for generating a D-C output signal proportional to the peaks of an input waveform comprising:
 (a) an input signal circuit;
 (b) an emitter follower amplifier for generating an output D-C voltage signal proportional to the peak amplitude of an input signal;
 (c) an RC integrating network coupled to control said emitter follower amplifier;
 (d) a one-shot multivibrator connected to charge said RC integrating network;
 (e) an inverting amplifier connected to trigger said multivibrator;
 (f) a tunnel diode comparator connected to the inverting amplifier for sensing a voltage level of the input signal proportionally exceeding the voltage level of the output signal;
 (g) large impedance resistors for applying the input signal and the output signal to said tunnel diode so that the tunnel diode fires when the input signal voltage level proportionally exceeds the voltage level of the output signal.

6. A tunnel diode dual level sensor comprising:
 (a) source of input signals;
 (b) means generating a D-C voltage output signal;
 (c) a first tunnel diode;
 (d) a first means including a network of resistors interconnecting elements (a), (b) and (c) for algebraically summing the input and output signals and applying the summed signals to said tunnel diode so that an input signal exceeding the level of the output signal will fire the tunnel diode;
 (e) first pulse generator circuit means responsive to the firing of said tunnel diode to generate error signals;
 (f) a first long time constant RC integrating circuit responsive to said error signals for generating the level sensor D-C voltage output signal;
 (g) a second tunnel diode, a second means including a network of resistors, a second pulse generator, a second long time constant RC integrating circuit, interconnected in the same manner as elements (a)–(f), and coupled in parallel therewith in respect to the input signals in such a manner that said first integrating circuit generates a signal proportional to one polarity of input signal peaks and said second integrating circuit generates a signal proportional to the other polarity peaks.

7. A dual level sensor circuit comprising:
(a) a pair of opposite polarity signal level sensors, each sensor including,
   (1) an emitter follower amplifier for generating an output D-C voltage signal proportional to the peak amplitude of an input signal;
   (2) an RC integrating network coupled to control said emitter follower amplifier;
   (3) a multivibrator connected to charge said RC integrating network;
   (4) an inverting amplifier connected to trigger said multivibrator;
   (5) a tunnel diode comparator for sensing a voltage level of the input signal exceeding the corresponding voltage level of the output signal;
   (6) large impedance resistors for applying the input signal and the output signal to said tunnel diode so that the tunnel diode fires when the voltage level of the input signal exceeds the output voltage signal;
(b) a multivibrator circuit for applying bias pulses to said tunnel diode comparators;
(c) means to apply the input signals to said signal level sensors in parallel.

No references cited.

ARTHUR GAUSS, *Primary Examiner.*

DAVID J. GALVIN, *Examiner.*

JOHN ZAZWORSKY, *Assistant Examiner.*